(12) United States Patent
Izumiura et al.

(10) Patent No.: US 6,794,765 B2
(45) Date of Patent: Sep. 21, 2004

(54) ENGINE STARTING CONTROL SYSTEM AND METHOD THEREFOR

(75) Inventors: Atsushi Izumiura, Utsunomiya (JP); Naoya Miyamoto, Utsunomiya (JP); Katsuhiro Kumagai, Utsunomiya (JP); Takashi Kiyomiya, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 278 days.

(21) Appl. No.: 10/107,220

(22) Filed: Mar. 28, 2002

(65) Prior Publication Data

US 2002/0145287 A1 Oct. 10, 2002

(30) Foreign Application Priority Data

Apr. 4, 2001 (JP) ..................................... P2001-106382

(51) Int. Cl.[7] ................................................ F02N 11/08
(52) U.S. Cl. ................. 290/38 R; 290/40 C; 123/179.3
(58) Field of Search ............................ 290/38 R, 40 C; 180/65.2; 123/179.3

(56) References Cited

U.S. PATENT DOCUMENTS

| | | | | |
|---|---|---|---|---|
| 4,577,599 A | * | 3/1986 | Chmielewski | ........... 123/179.2 |
| 4,862,010 A | * | 8/1989 | Yamamoto | ................. 290/38 R |
| 5,495,127 A | * | 2/1996 | Aota et al. | ..................... 290/31 |
| 5,823,280 A | * | 10/1998 | Lateur et al. | ............... 180/65.2 |
| 6,209,517 B1 | * | 4/2001 | Yasui | .................... 123/339.11 |
| 6,247,437 B1 | * | 6/2001 | Yamaguchi et al. | ...... 123/179.3 |
| 6,253,127 B1 | * | 6/2001 | Itoyama et al. | ................ 701/22 |
| 6,274,943 B1 | * | 8/2001 | Hasegawa et al. | ........ 290/40 C |
| 6,351,703 B1 | * | 2/2002 | Avery, Jr. | .................... 701/112 |

FOREIGN PATENT DOCUMENTS

| | | |
|---|---|---|
| EP | 1 113 169 A1 | 7/2001 |
| JP | 10-331749 | 12/1998 |

* cited by examiner

*Primary Examiner*—Joseph Waks
(74) *Attorney, Agent, or Firm*—Armstrong, Westerman & Hattori, LLP

(57) ABSTRACT

In order to improve the reliability of engine starting by using a motor, the engine cranking using the motor is started according to a request for starting the engine, and when the elapsed time from the starting time of the engine operation reaches a first predetermined time and it is detected that the transmission is in the in-gear state, the engine cranking is continued if the engine speed is equal to or less than a predetermined engine speed defined for determining whether the engine reaches a predetermined starting phase. The engine cranking may be continued for a second predetermined time which is longer than the first predetermined time.

10 Claims, 3 Drawing Sheets

ENGINE STARTING CONTROL SYSTEM AND METHOD THEREFOR

BACKGROUND OF THE INVENTION

1. Field of the Invention

The present invention relates to engine starting control systems having a motor coupled with the output shaft of an engine and a transmission, and in particular, relates to systems for starting the engine by using the motor.

2. Description of the Related Art

In general, a hybrid vehicle has an engine and a motor as driving sources, a portion of the output of the engine or the kinetic energy of the vehicle is converted into electric energy, and the converted electric energy is stored in a battery system. Some hybrid vehicles have an automatic transmission and an engine starting system, and when the engine is started, the electric energy stored in the battery system is used to drive the motor, so as to perform engine cranking by using the motor.

In order to reliably start the engine in such an engine starting system, the starting torque of the motor is maintained for a specific time after the engine is started (refer to, for example, Japanese Unexamined Patent Application, First Publication No. Hei 10-331749).

In a control system for hybrid vehicles having the above-explained engine starting system, the motor torque generation time is short (e.g., approximately 1.5 sec) so as to minimize energy consumption as much as possible. This setting causes no problem when the vehicle is driven under normal conditions.

However, if the fuel is low quality gasoline or the like, the required torque may not be obtained when the set generation time has passed. In this case, when the automatic transmission is set in the in-gear state after the starting of the engine, the engine (rotation) speed may decrease or the engine may stall. In order to prevent such a situation, the motor torque generation time may be set to be longer. However, in this case, power consumption of the motor increases so that the battery system (e.g., a battery) tends to discharge, so that an energy management problem may occur or the capacity (i.e., size) of the battery system may have to be increased.

SUMMARY OF THE INVENTION

In consideration of the above circumstances, an object of the present invention is to provide a control system for hybrid vehicles, which can improve the reliability of the engine starting by using a motor and suppress energy consumption at the engine starting.

Therefore, the present invention provides an engine starting control system comprising:
- a motor (e.g., a motor M in an embodiment explained below) coupled with an output shaft of an engine (e.g., an engine E in the embodiment explained below);
- a transmission (e.g., an automatic transmission T in the embodiment explained below);
- a motor control section (e.g., a motor ECU 1 in the embodiment explained below) for starting the engine by using the motor according to a request for starting the engine;
- an in-gear detecting section for detecting an in-gear state of the transmission (refer to a CVT in-gear determination flag F_ATNP in the embodiment explained below);
- a measurement section for measuring an elapsed time from the starting time of the engine operation (refer to a timer T01ACR in the embodiment explained below); and
- an engine speed detecting section (e.g., an engine speed sensor S2 in the embodiment explained below) for detecting an engine speed of the engine, wherein:
  the motor control section starts engine cranking using the motor according to the request for starting the engine; and
  when the elapsed time measured by the measurement section reaches a first predetermined time and the in-gear detection section detects that the transmission is in the in-gear state, the motor control section continues the engine cranking if the engine speed detected by the engine speed detecting section is equal to or less than a predetermined engine speed (e.g., a self-recovery engine speed #NCRMOT in the embodiment explained below) defined for determining whether the engine reaches a predetermined starting phase.

According to the above structure, while the transmission is in the in-gear state after the engine is started, engine cranking using the motor can be continued until the engine speed exceeds the above-explained predetermined engine speed.

the engine cranking may be continued for a second predetermined time which is longer than the first predetermined time. Accordingly, the engine can be reliably started.

If the engine speed detecting section detects an engine speed equal to or greater than the predetermined engine speed during the second predetermined time, the motor control section may complete the engine starting operation using the motor. Accordingly, a necessary and minimum duration for the engine cranking using the motor can be obtained.

If the engine speed detecting section detects an engine speed equal to or greater than the predetermined engine speed after the second predetermined time has elapsed, the motor control section may complete the engine starting operation using the motor. Accordingly, it is possible to prevent the engine cranking using the motor from being continued endlessly.

Typically, the motor is a drive motor for a hybrid vehicle, wherein an output of the motor is added to the engine output. In this case, the performance of the engine starting of the hybrid vehicle can be improved.

The present invention also provides an engine starting control method (corresponding to the above system) comprising:
- a motor control step of starting an engine by using a motor according to a request for starting the engine, where the motor is coupled with an output shaft of the engine;
- an in-gear detecting step of detecting an in-gear state of a transmission;
- a measurement step of measuring an elapsed time from the starting time of the engine operation; and
- an engine speed detecting step of detecting an engine speed of the engine, wherein:
  the motor control step includes starting engine cranking by using the motor according to the request for starting the engine; and
  when the elapsed time measured in the measurement step reaches a first predetermined time and it is detected in the in-gear detection step that the transmission is in the in-gear state, the engine cranking performed in the motor control step is continued if the engine speed detected in the engine speed detecting step is equal to or less than a predetermined engine speed defined for determining whether the engine reaches a predetermined starting phase.

DESCRIPTION OF THE PREFERRED EMBODIMENTS

Figure 2:
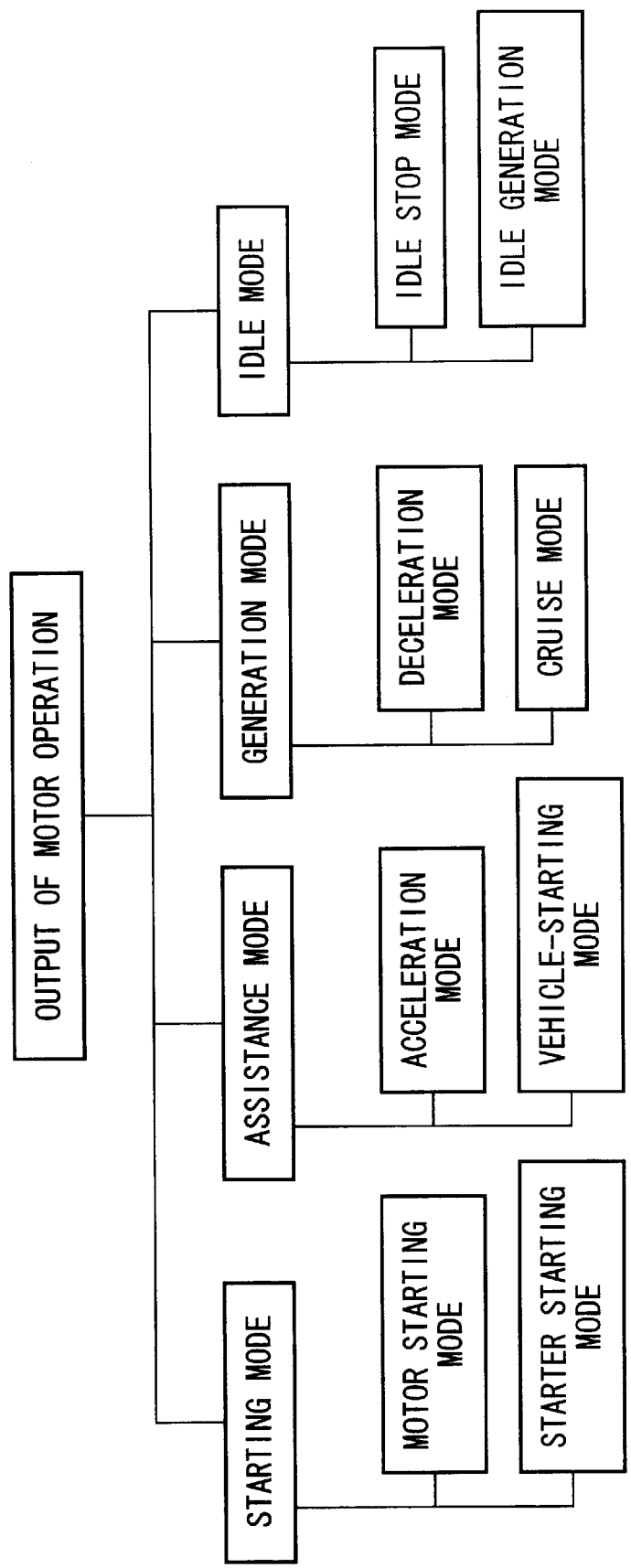
FIG. 2 is a diagram showing basic motor operation modes.
Figure 3:
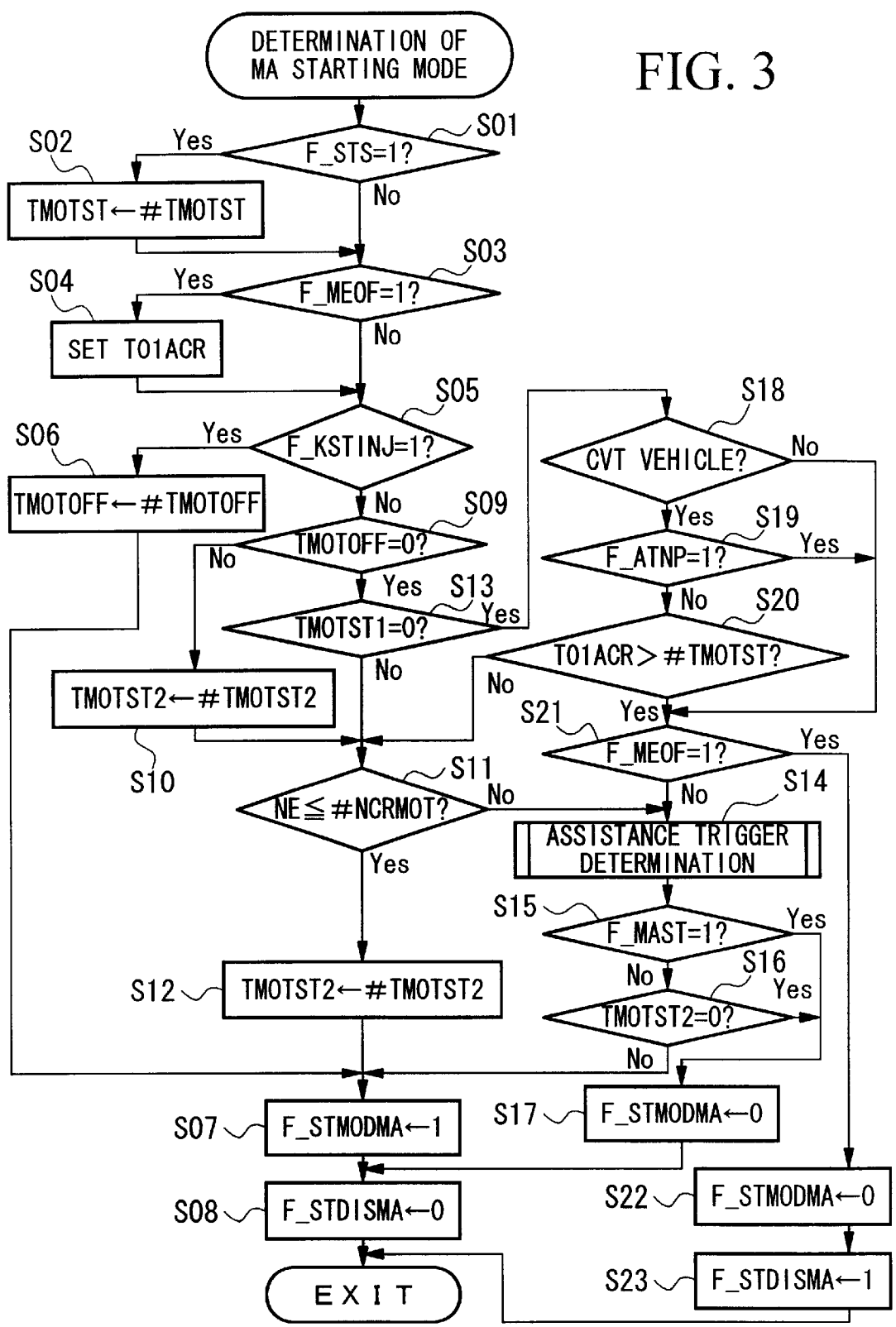
FIG. 3 is a flowchart showing an engine starting control operation performed in the embodiment.

Hereinafter, an engine starting control system as an embodiment of the present invention will be explained with reference to FIGS. 1 to 3.

Figure 1:
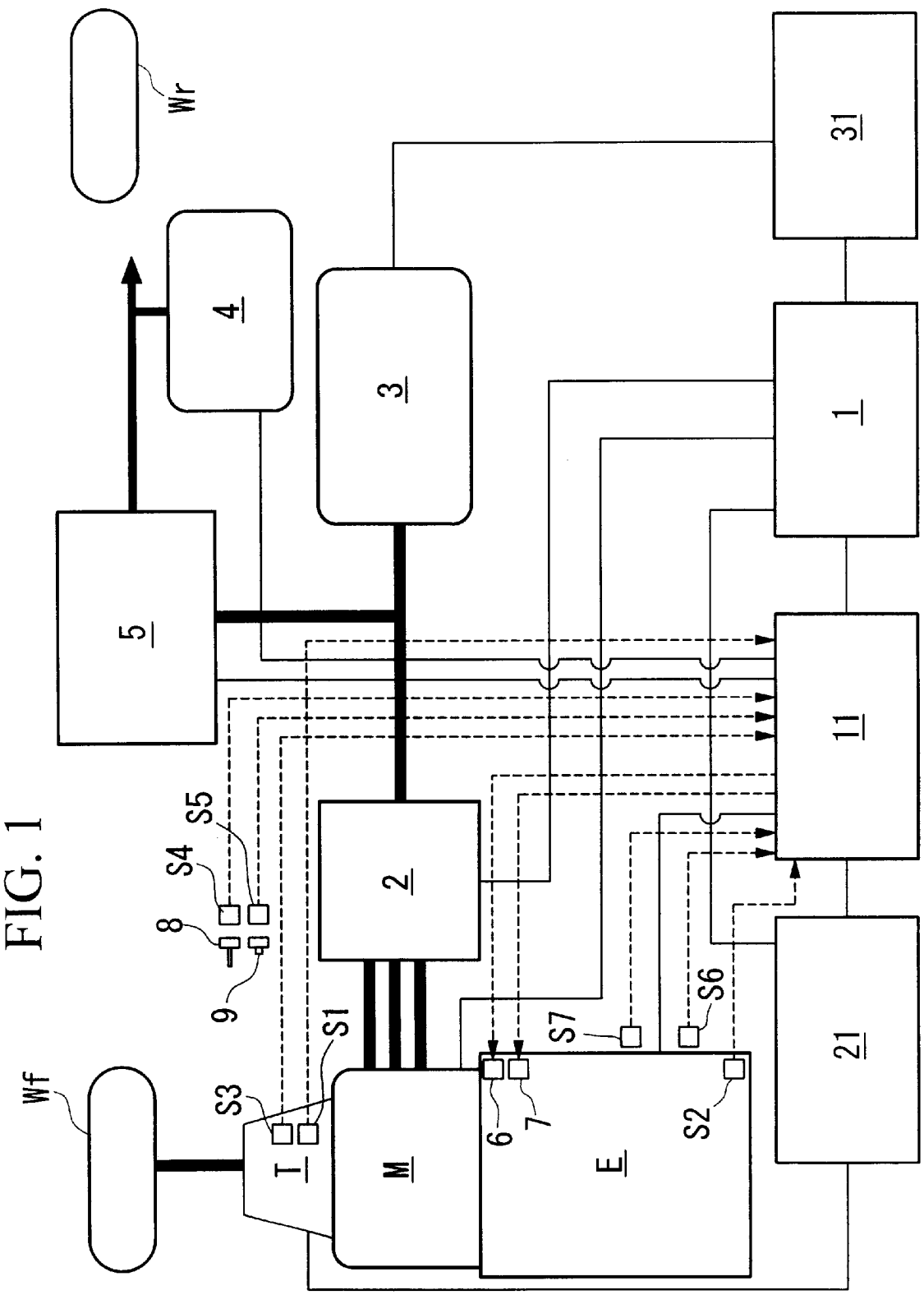
FIG. 1 is a block diagram illustrating the general structure of a parallel hybrid vehicle which employs an engine starting control system as an embodiment according to the present invention.

FIG. 1 is a block diagram illustrating the general structure of a parallel hybrid vehicle in the present embodiment, in which an engine E and an electric motor M as driving sources and an automatic transmission T are serially and directly coupled. The driving force generated by both the engine E and the electric motor M is transmitted via the automatic transmission T to the driving wheels (here, front wheels) Wf. The automatic transmission T of the present embodiment is a CVT (continuously variable transmission). At the time of the deceleration of the hybrid vehicle, the driving force is transmitted from the driving wheels Wf to the electric motor M, and the electric motor M functions as a generator for generating what is termed regenerative braking force, that is, the kinetic energy of the vehicle body is recovered and stored as electric energy. In FIG. 1, reference symbol Wr indicates rear wheels.

The driving of the motor M and the regenerating operation of the motor M are controlled by a power drive unit 2 according to control commands from a motor ECU 1. A high voltage battery 3 (i.e., a battery system) for sending and receiving electric energy to and from the motor M is connected to the power drive unit 2. The battery 3 includes a plurality of modules connected in series, and in each module, a plurality of cells are connected in series. The hybrid vehicle includes a 12-V auxiliary battery 4 for driving various accessories (or auxiliary devices). The auxiliary battery 4 is connected to the battery 3 via a DC—DC converter (called a "downverter") 5. The DC—DC converter 5, controlled by an FIECU 11, reduces the voltage from the battery 3 so as to charge the auxiliary battery 4.

The FIECU 11 controls, in addition to the motor ECU 1 and the downverter 5, a fuel supply amount controller 6 for controlling the amount of fuel supplied to the engine E, a starter motor 7, and ignition timing, etc. Therefore, the FIECU 11 receives (i) a signal from a speed sensor S1 for detecting vehicle speed V based on the rotation speed of the drive shaft of transmission T, (ii) a signal from an engine speed sensor S2 for detecting engine speed NE, (iii) a signal from a shift position sensor S3 for detecting the shift position of the transmission T, (iv) a signal from a brake switch S4 for detecting operation of a brake pedal 8, (v) a signal from a starter switch S5 for detecting ON/OFF operation of a starter switch 9, (vi) a signal from a throttle opening-degree sensor S6 for detecting the degree of throttle (valve) opening TH, and (vii) a signal from an air-intake passage negative pressure sensor S7 for detecting the air-intake passage negative pressure PBGA. Reference numeral 21 indicates a CVTECU which controls the CVT, and reference numeral 31 indicates a battery ECU which protects the battery 3 and calculates the state of charge SOC (i.e., remaining battery charge) of the battery 3.

Below, with reference to the block diagram of FIG. 2, basic motor operation modes will be explained in consideration of the output of the motor operation. The present system has four basic motor operation modes: a starting mode, an assistance mode, a generation mode, and an idle mode.

In the starting mode, the engine E is started by the motor M or the starter motor 7. That is, the starting mode includes the following two modes: a motor starting mode for starting the engine E using the motor M when the SOC of the battery 3 is large, and a starter starting mode for starting the engine E using the starter motor 7 when the SOC of the battery 3 is small.

In the assistance mode, the motor M assists the driving of the engine. The assistance mode includes the following two modes: an acceleration mode for assisting the driving of the engine E during acceleration, and a vehicle-starting mode for assisting the driving of the engine E when the vehicle is started.

In the generation mode, the motor M is operated as a generator, so that the kinetic energy of the vehicle is converted as electric energy and is stored in the battery 3. The generation mode includes the following two modes: a deceleration mode for executing regenerative braking by using the motor M and a cruise mode for executing regeneration according to the situation while driving the vehicle using the driving force of the engine E.

In the idle mode, the engine E is maintained in an idle state by restarting the fuel supply after the fuel is cut. The idle mode includes the following two modes: an idle generation mode for executing regeneration by using the motor M in the idle state and an idle stop mode for stopping the engine under specific conditions when the vehicle is stopped or the like.

In the above starting mode of the present vehicle, while the CVT is in the in-gear state after the engine is started, the engine cranking using the motor is continued until the engine speed exceeds a predetermined speed. Accordingly, it is possible to prevent the decrease of engine speed or the occurrence of engine stall after the engine cranking is stopped. Therefore, the reliability of the engine starting using the motor in the hybrid vehicle can be improved.

Below, the operation for controlling the engine starting of the hybrid vehicle in the present embodiment will be explained with reference to the flowchart in FIG. 3. The determination process of the MA starting mode, shown by the flowchart of FIG. 3, is executed in the above starting mode by the motor ECU 1 at regular intervals (for example, every 10 msec).

The hybrid vehicle in the present embodiment employs the CVT (the vehicle is called a "CVT vehicle" hereinbelow). However, the following flowchart also relates to a vehicle employing a manual transmission (i.e., an MT vehicle) in consideration of the specification of the system.

In the first step S01, it is determined whether the value of a starter switch determination flag F_STS is 1. If the result of the determination is "YES" (i.e., the starter switch is on), then the operation proceeds to step S02, while if the result of the determination is "NO" (i.e., the starter switch is off), then the operation proceeds to step S03.

In step S02, the timer value of a starting mode maintaining timer TMOTST (provided for maintaining the starting mode after the engine is started) is set to a set value #TMOTST (e.g., 4 sec), and the operation proceeds to step S03.

In step S03, it is determined whether the value of an engine stop determination flag F_MEOF is 1. If the result of the determination is "YES" (i.e., the engine is stopped), then the operation proceeds to step S04, while if the result of the determination is "NO" (i.e., the engine is operating), then the operation proceeds to step S05.

In step S04, the timer value of a timer T01ACR for indicating the elapsed time after the engine is started is set to 0, and the operation proceeds to step S05.

In step S05, it is determined whether the value of a KSTINJ operation flag F_KSTINJ, which is set at the fuel injection (FI) side, is 1. If the result of the determination is "YES" (i.e., the amount of fuel is gradually increased), then the operation proceeds to step S06, while if the result of the determination is "NO" (i.e., the gradual increase of the amount of fuel has been completed), then the operation proceeds to step S09. That is, the KSTINJ operation flag F_KSTINJ has a value of 1 while the amount of fuel injected into the engine is gradually increased, or has a value of 0 when the gradual increase of the amount of fuel injected into the engine has been completed.

In step S06, the timer value of a delay timer TMOTOFF for releasing the starting mode after the KSTINJ operation is set to a set value #TMOTOFF (e.g., 0.2 sec), and the operation proceeds to step S07.

In step S07, the value of a MA (motor assistance) starting mode determination flag F_STMODMA is set to 1, and the operation proceeds to step S08. This MA starting mode determination flag F_STMODMA has a value of 1 before the engine starting is completed, or has a value of 0 after the engine starting has been completed.

In step S08, the value of an MA starting disable determination flag F_STDISMA is set to 0, and the present control operation is completed. The MA starting disable determination flag F_STDISMA has a value of 1 after the engine is stopped, or has a value of 0 while the engine is operating.

In step S09, it is determined whether the timer value of the delay timer TMOTOFF (used for releasing the starting mode after the KSTINJ operation) is 0. If the result of the determination is "NO", then the operation proceeds to step S10, while if the result of the determination is "YES", then the operation proceeds to step S13.

In step S10, the timer value of a starting mode maintaining timer TMOTST2 referred to after a self-recovery engine speed is achieved is set to a set value #TMOTST2 (e.g., 0.2 sec), and the operation proceeds to step S11.

In step S11, it is determined whether the engine speed NE is equal to or less than a self-recovery engine speed #NCRMOT. If the result of the determination is "YES", then the operation proceeds to step S12, while if the result of the determination is "NO", then the operation proceeds to step S14.

The self-recovery engine speed #NCRMOT is a predetermined threshold engine speed (e.g., 700 to 850 rpm) for determining whether the engine can self-recover and work. When the engine speed is equal to or less than the self-recovery engine speed #NCRMOT, if the CVT is set in the in-gear state, then the engine speed may decrease or the engine may stall due to negative torque, so that the self-recovery is impossible. Conversely, when the engine speed exceeds the self-recovery engine speed #NCRMOT, the engine speed does not decrease nor does the engine stall even if the CVT is set in the in-gear state, so that the self-recovery is possible.

In step S12, the timer value of the above starting mode maintaining timer TMOTST2 is set to a set value #TMOTST2 (e.g., 0.2 sec); then, the operation proceeds to step S07.

In step S13, it is determined whether the value of a first starting mode maintaining timer TMOTST1 referred to after the engine is started is 0. If the result of the determination is "NO", the operation proceeds to step S11, while if the result of the determination is "YES", the operation proceeds to step S18.

The timer value of this first starting mode maintaining timer TMOTST1 is set to a set value #TMOTST1 (e.g., 1.2 sec) immediately after the engine is started. In the present embodiment, this set value #TMOTST1 corresponds to the first predetermined time of the present invention.

In step S14, an assistance trigger determination process is executed, and then the operation proceeds to step S15. In step S15, it is determined whether the value of a motor assistance determination flag F_MAST is 1. If the result of the determination is "NO", the operation proceeds to step S16, while if the result of the determination is "YES", the operation proceeds to step S17.

The motor assistance determination flag F_MAST has a value of 1 when it is determined (according to the assistance trigger determination process) that the engine driving should be assisted using the motor (i.e., motor assistance), or has a value of 0 when it is determined that the motor assistance is unnecessary.

In step S16, it is determined whether the timer value of the starting mode maintaining timer TMOTST2 (referred to after the self-recovery engine speed is achieved) is 0. If the result of the determination is "YES", the operation proceeds to step S17, while if the result of the determination is "NO", the operation proceeds to step S07.

In step S17, the value of the MA starting mode determination flag F_STMODMA is set to 0, then the operation proceeds to step S08.

According to the above operation, after the engine cranking using the motor is started, until the counting of the set value of the first starting mode maintaining timer TMOTST1 is finished, (i) the engine cranking using the motor is continued if the engine speed is equal to or less than the self-recovery engine speed, or (ii) if the engine speed exceeds the self-recovery engine speed, the following operation is executed: that is, in this case, (iii) if the value of the motor assistance determination flag F_MAST is 0 (i.e., the motor assistance is unnecessary), until the counting of the set value of the starting mode maintaining timer TMOTST2 (referred to after the self-recovery engine speed is achieved) is finished, the engine cranking using the motor is continued, and when the counting of the set value of the starting mode maintaining timer TMOTST2 is completed, the engine cranking is finished, while (iv) if the value of the motor assistance determination flag F_MAST is 1 (i.e., the motor assistance is necessary), the engine cranking using the motor is immediately finished.

When the result of the determination in step S13 is "YES" and the operation proceeds to step S18, it is determined in step S18 whether the present vehicle is a CVT vehicle. If the result of the determination is "YES" (i.e., that it is a CVT vehicle), then the operation proceeds to step S19, while if the result of the determination is "NO" (i.e., that it is an MT vehicle), then the operation proceeds to step S21.

In step S19, it is determined whether a CVT in-gear determination flag F_ATNP is 1. If the result of the determination is "NO" (i.e., in the in-gear state), then the operation proceeds to step S20, while if the result of the determination is "YES" (i.e., in the N (neutral) or P (parking) range), then the operation proceeds to step S21. That is, the CVT in-gear determination flag F_ATNP has a value of 1 when the CVT is not in the in-gear state (i.e., in the N (neutral) or P (parking) range), or has a value of 0 when the CVT is in the in-gear state.

In step S20, it is determined whether the timer value of the timer T01ACR (for indicating the elapsed time after the engine is started) exceeds the set value #TMOTST of the starting mode maintaining timer TMOTST (referred to after the engine start). If the result of the determination is "NO", then the operation proceeds to step S11, while if the result of the determination is "YES", then the operation proceeds to step S21.

Therefore, even after the counting of the set value of the first starting mode maintaining timer TMOTST1 is completed, until the elapsed time after the engine start exceeds the set value #TMOTST of the starting mode maintaining timer TMOTST, the engine cranking using the motor is continued if the CVT is in the in-gear state and the engine speed is equal to or less than the self-recovery engine speed. Accordingly, the engine can be reliably started using the motor.

Before the elapsed time, measured after the counting of the first starting mode maintaining timer TMOTST 1 is finished, exceeds the set value #TMOTST of the starting mode maintaining timer TMOTST, if the CVT is in the in-gear state and the engine speed exceeds the self-recovery engine speed, the following operation is executed: that is, (i) if the value of the motor assistance determination flag F_MAST is 0 (i.e., the motor assistance is unnecessary), then the engine cranking using the motor is continued until the counting of the set value of the starting mode maintaining timer TMOTST2 (referred to after the self-rest engine speed is achieved) is finished, and the engine cranking using the motor is finished after the counting of the above set value is finished, while (ii) if the value of the motor assistance determination flag F_MAST is 1 (i.e., the motor assistance is necessary), then the engine cranking using the motor is immediately completed.

Therefore, the continuation of the engine cranking using the motor can be as short as possible, so that the power consumption necessary for the engine starting can be as small as possible and the load imposed on the battery can be low. In this case, the elapsed time from the engine start (i.e., from the time when the engine starting operation is started) to the time when the engine speed exceeds the self-rest engine speed corresponds to the second predetermined time of the present invention.

When the result of the determination in step S20 is "YES" and the operation proceeds to step S21, it is determined in step S21 whether the value of the engine stop determination flag F_MEOF is 1. If the result of the determination is "NO" (i.e., the engine is operating), then the operation proceeds to step S14, while if the result of the determination is "YES" (i.e., the engine is stopped), then the operation proceeds to step S22.

In step S22, the value of the MA starting mode determination flag F_STMODMA is set to 0, then the operation proceeds to step S23. In step S23, the value of the MA starting disable determination flag F_STDISMA is set to 1, and the present operation is completed.

Therefore, if the engine speed does not exceed the self-rest engine speed even after the elapsed time after the engine start exceeds the set value #TMOTST of the starting mode maintaining timer TMOTST, then the engine cranking is forcibly terminated so as to finish the engine starting operation. Accordingly, it is possible to prevent the engine cranking using the motor from being continued endlessly. Therefore, power consumed for the engine starting can be reduced and suppressed.

The present invention is not limited to the above-explained embodiment; for example, the automatic transmission may be a step-variable transmission instead of the CVT (continuously variable transmission).

In addition, in the above embodiment, the counting of the second predetermined time is started when the engine operation is started; however, the counting of the second predetermined time may be started when the first predetermined time has elapsed.

What is claimed is:

1. An engine starting control system comprising:
    a motor coupled with an output shaft of an engine;
    a transmission;
    a motor control section for starting the engine by using the motor according to a request for starting the engine;
    an in-gear detecting section for detecting an in-gear state of the transmission;
    a measurement section for measuring an elapsed time from the starting time of the engine operation; and
    an engine speed detecting section for detecting an engine speed of the engine, wherein:
        the motor control section starts engine cranking using the motor according to the request for starting the engine; and
        when the elapsed time measured by the measurement section reaches a first predetermined time and the in-gear detection section detects that the transmission is in the in-gear state, the motor control section continues the engine cranking if the engine speed detected by the engine speed detecting section is equal to or less than a predetermined engine speed defined for determining whether the engine reaches a predetermined starting phase.

2. An engine starting control system as claimed in claim 1, wherein the engine cranking is continued for a second predetermined time which is longer than the first predetermined time.

3. An engine starting control system as claimed in claim 2, wherein if the engine speed detecting section detects an engine speed equal to or greater than the predetermined engine speed during the second predetermined time, then the motor control section completes the engine starting operation using the motor.

4. An engine starting control system as claimed in claim 2, wherein if the engine speed detecting section detects an engine speed equal to or greater than the predetermined engine speed after the second predetermined time has elapsed, then the motor control section completes the engine starting operation using the motor.

5. An engine starting control system as claimed in claim 1, wherein the motor is a drive motor for a hybrid vehicle, wherein an output of the motor is added to the engine output.

6. An engine starting control method comprising:
    a motor control step of starting an engine by using a motor according to a request for starting the engine, where the motor is coupled with an output shaft of the engine;
    an in-gear detecting step of detecting an in-gear state of a transmission;

a measurement step of measuring an elapsed time from the starting time of the engine operation; and an engine speed detecting step of detecting an engine speed of the engine, wherein:

the motor control step includes starting engine cranking by using the motor according to the request for starting the engine; and when the elapsed time measured in the measurement step reaches a first predetermined time and it is detected in the in-gear detection step that the transmission is in the in-gear state, the engine cranking performed in the motor control step is continued if the engine speed detected in the engine speed detecting step is equal to or less than a predetermined engine speed defined for determining whether the engine reaches a predetermined starting phase.

7. An engine starting control method as claimed in claim 6, wherein the engine cranking is continued for a second predetermined time which is longer than the first predetermined time.

8. An engine starting control method as claimed in claim 7, wherein if the engine speed detected in the engine speed detecting step is equal to or greater than the predetermined engine speed during the second predetermined time, then in the motor control step, the engine starting operation using the motor is completed.

9. An engine starting control method as claimed in claim 7, wherein if the engine speed detected in the engine speed detecting step is equal to or greater than the predetermined engine speed after the second predetermined time has elapsed, then in the motor control step, the engine starting operation using the motor is completed.

10. An engine starting control method as claimed in claim 6, wherein the motor is a drive motor for a hybrid vehicle, wherein an output of the motor is added to the engine output.

* * * * *